No. 859,605. PATENTED JULY 9, 1907.
J. W. KIRKBRIDE.
BAKE PAN.
APPLICATION FILED APR. 1, 1907.
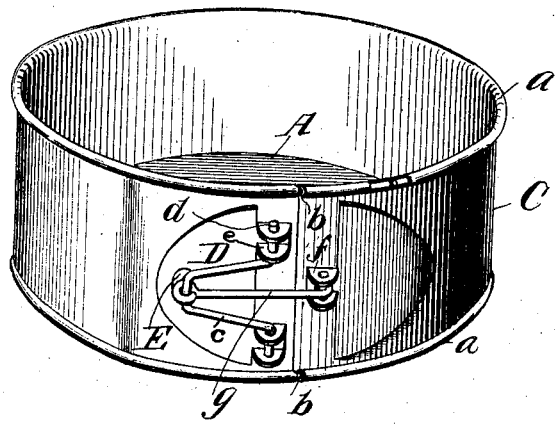
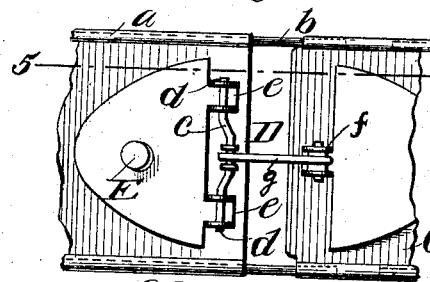
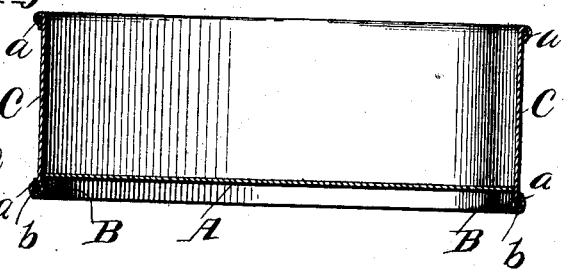
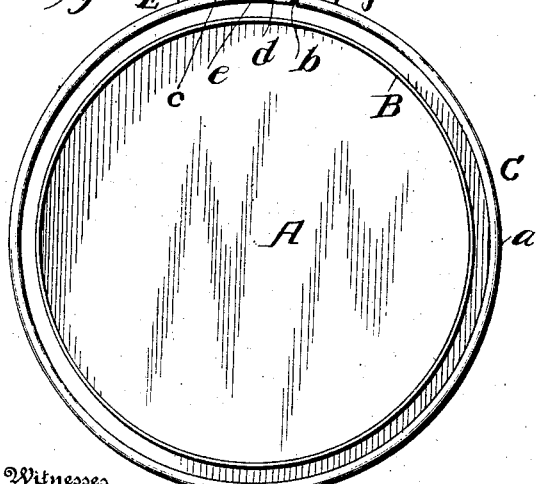
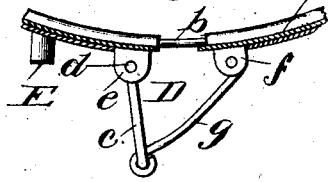
Witnesses
Inventor
J. W. Kirkbride
James J. Shehy
By
Attorney

UNITED STATES PATENT OFFICE.

JOHN W. KIRKBRIDE, OF EGG HARBOR CITY, NEW JERSEY.

BAKE-PAN.

No. 859,605.

Specification of Letters Patent.

Patented July 9, 1907.

Application filed April 1, 1907. Serial No. 365,759.

*To all whom it may concern:*

Be it known that I, JOHN W. KIRKBRIDE, a citizen of the United States, residing at Egg Harbor City, in the county of Atlantic and State of New Jersey, have invented new and useful Improvements in Bake-Pans, of which the following is a specification.

My invention pertains to bake pans for cakes and the like; and it has for one of its objects to provide a bake pan comprising a bottom, a body band, and means whereby the body band may be expeditiously and easily clasped about the bottom to adapt the pan to receive and hold dough and may be readily disengaged and removed from the bottom so as to leave a baked cake in position thereon.

Another object of the invention is the provision of a bake pan for cakes and the like, embodying a bottom provided with means whereby it may be positioned in the body band in such manner as to materially lessen the liability of a cake being burned incident to the baking thereof.

With the foregoing in mind the invention will be fully understood from the following description and claim when the same are read in connection with the accompanying drawings, forming part of this specification, in which:

Figure 1 is a perspective view illustrating the bake pan constituting the present and preferred embodiment of my invention, as said pan appears when ready to receive dough. Fig. 2 is a detail view showing the end portions of the body band and the fastener as the same appear when the fastener is opened to expand the body band and permit of ready removal of said band from the bottom. Fig. 3 is a diametrical section of the pan. Fig. 4 is an inverted plan view thereof, and: Fig. 5 is a detail horizontal section taken in the plane indicated by the line 5—5 of Fig. 2, looking downward.

Similar letters designate corresponding parts in all of the views of the drawings, referring to which:

A is the bottom of my novel bake pan, which is circular in outline and is made of tin or other material suitable to the purpose of the invention. The said bottom A is provided on its under side with a depending circular flange B as shown, for an important purpose presently set forth.

C is the body band of the pan which is preferably formed of tin and is possessed of resiliency so as to adapt it to spring away from the perimeter of the bottom A when the fastener presently described is opened. The said body band is provided at its upper and lower edges with barrels or tubular portions $a$, and in these barrels or tubular portions are arranged wires $b$ which are designed to lend stiffness and strength to the body band and are also designed to guide the ends of the body band together when the fastener is closed to form the pan illustrated in Figs. 1, 3 and 4. I prefer to arrange the wires $b$ as shown in Fig. 1—that is to say, with the left hand end portions of the wires loosely received in the barrels or tubular portions $a$ of the right hand end of the body band, this in order to enable said end of the body band to freely move toward and from the other end thereof.

D is the fastener of my improvements, and E is a projection on the body band, against which the swinging member of the fastener is adapted to abut when the fastener is closed, as shown in Fig. 1. The said fastener D comprises a U-shaped swinging member $c$ having end portions $d$ journaled in lugs $e$ on one end portion, preferably the left-hand end portion, of the body band C, a lug $f$ on the other end portion of said body band, and a link $g$ pivoted to the lug $f$ and the bight of the swinging member $c$. By virtue of this construction it will be apparent that when the swinging member $c$ of the fasener is swung from the position shown in Fig. 2 to that shown in Fig. 1 the end portions of the body band C will be drawn together, and because of the connections of the swinging member $c$ and the link $g$ resting in a dead center will be secured in such position and against casual movement relative to each other. It will also be apparent that when the swinging member $c$ of the fastener is swung outward sufficiently far to carry the connection between it and the link $g$ out of the dead center, the resiliency of the body band C will move the ends of the said body band apart and fully open the fastener after the manner shown in Fig. 2. The projection E serves to stop the link $g$ and the swinging member $c$ of the fastener in proper positions to assure the production of the dead center mentioned, and it also serves to enable an operator to conveniently take hold of the swinging member $c$ when it is desired to open the body band C to permit of ready removal of said body band from the bottom A and a baked cake on the latter.

In assembling the parts of my improvements, the bottom A is arranged with its flange B bearing on a suitable base, and the band C is positioned in its open state around the said bottom and so that its lower edge rests on the mentioned base. The fastener D is then closed, when, as will be readily apparent, the bottom A will be clasped and securely held in the body band C. At this point it will be noted that by virtue of the bottom A having the flange B on its under side, said bottom A is secured in the body band C at a considerable distance above the lower edge of said body band. From this it follows that when the pan is in use and a cake is being baked, there is little liability of the bottom of the cake being burned, which is obviously an important advantage.

The construction herein shown and described constitutes the preferred embodiment of my invention, but it is obvious that in practice various changes in the form, construction and relative arrangement of parts may be made without involving departure from the scope of my invention as defined in the claims appended.

Having described my invention, what I claim and desire to secure by Letters-Patent, is:

A bake pan comprising a bottom, a split body band arranged to engage and hold the bottom and having a radial projection on the outer side of one of its end portions, a U-shaped fastening member pivoted to lugs on the outer side of the said end portion of the band, and a link pivoted to the bight of said U-shaped fastening member and also to a lug on the other end portion of the band; the connected portions of the said U-shaped fastening member and the link being arranged when the pan is closed to bring up against the said radial projection on the body band.

In testimony whereof I have hereunto set my hand in presence of two subscribing witnesses.

JOHN W. KIRKBRIDE.

Witnesses:
CHAS. S. LUTZ,
ELISHA S. SMITH.